US008559059B2

(12) United States Patent
Ozawa et al.

(10) Patent No.: US 8,559,059 B2
(45) Date of Patent: Oct. 15, 2013

(54) IMAGE PROCESSING DEVICE SUPERIMPOSING SUPPLEMENTAL IMAGE TO ENCOMPASS AREA OF ORIGINAL BASED ON LUMINANCE DIFFERENCE BETWEEN NEARBY PIXELS

(75) Inventors: Ryohei Ozawa, Nagoya (JP); Masaki Kondo, Toyoake (JP)

(73) Assignee: Brother Kogyo Kabushiki Kaisha, Nagoya-Shi, Aichi-Ken (JP)

( * ) Notice: Subject to any disclaimer, the term of this patent is extended or adjusted under 35 U.S.C. 154(b) by 276 days.

(21) Appl. No.: 13/073,643

(22) Filed: Mar. 28, 2011

(65) Prior Publication Data

US 2012/0026553 A1 Feb. 2, 2012

(30) Foreign Application Priority Data

Jul. 29, 2010 (JP) ................................. 2010-170857

(51) Int. Cl.
*H04N 1/387* (2006.01)

(52) U.S. Cl.
USPC ............ 358/1.9; 358/3.27; 358/450; 358/452

(58) Field of Classification Search
USPC ......... 358/1.9, 2.1, 3.27, 1.18, 527, 530, 537, 358/538, 447, 448, 450, 452, 453, 461; 382/162, 173, 190, 194, 195, 205, 254, 382/274, 276, 282, 284
See application file for complete search history.

(56) References Cited

U.S. PATENT DOCUMENTS

| | | | |
|---|---|---|---|
| 6,658,163 B1 | 12/2003 | Takaoka | |
| 7,444,036 B2 * | 10/2008 | Matsunoshita et al. | 382/284 |
| 8,300,925 B2 * | 10/2012 | Kunieda | 382/276 |
| 2007/0147703 A1 * | 6/2007 | Watson et al. | 382/284 |

FOREIGN PATENT DOCUMENTS

| | | | | |
|---|---|---|---|---|
| JP | 11232435 A | * | 8/1999 | |
| JP | H11-232435 | | 8/1999 | |
| JP | 11346303 A | * | 12/1999 | |
| JP | H11-346303 | | 12/1999 | |
| JP | 2001-169083 A | | 6/2001 | |
| JP | 2003-058880 A | | 2/2003 | |
| JP | 2003-256832 A | | 9/2003 | |

OTHER PUBLICATIONS

Office Action dated Nov. 8, 2012 received from the Japanese Patent Office from related Japanese Application No. 2011-092019, together with an English-language translation.

* cited by examiner

*Primary Examiner* — Scott A Rogers
(74) *Attorney, Agent, or Firm* — Scully, Scott, Murphy & Presser, P.C.

(57) ABSTRACT

An image processing device includes a focal pixel setting unit, a near pixel setting unit, a calculating unit, a target pixel determining unit, and an editing unit. The focal pixel setting unit is configured to set a focal pixel among a plurality of pixels in an original image that is represented by original image data. The near pixel setting unit is configured to set a pixel near the focal pixel as a near pixel. The calculating unit is configured to calculate a characteristic value related to luminance of the focal pixel and luminance of the near pixel. The target pixel determining unit is configured to determine, as the target pixel, the focal pixel whose characteristic value satisfies a prescribed condition. The editing unit is configured to generate edited image data by editing the original image data. The edited image data represents an edited image having a supplemental image superimposed on the original image. The supplemental image is superimposed on an area encompassing the target pixel.

12 Claims, 10 Drawing Sheets

IMAGE PROCESSING DEVICE SUPERIMPOSING SUPPLEMENTAL IMAGE TO ENCOMPASS AREA OF ORIGINAL BASED ON LUMINANCE DIFFERENCE BETWEEN NEARBY PIXELS

CROSS REFERENCE TO RELATED APPLICATION

This application claims priority from Japanese Patent Application No. 2010-170857 filed Jul. 29, 2010. The entire content of the priority application is incorporated herein by reference.

TECHNICAL FIELD

The present invention relates to an image processing device.

BACKGROUND

There are various techniques known in the art for producing rays of light or other decorative elements in digital images, such as photographs. For example, one technique extracts very bright pixels having a luminance greater than a prescribed value, such as pixels for point light sources or specular highlights, and produces star patterns in the original image centered on the extracted bright pixels, creating an effect that emphasizes light from the point light sources and the like.

SUMMARY

However, this technique can sometimes produce a large number of star patterns in image areas having a concentration of high-luminance pixels, such as within an image of clouds on a bright day. In such cases, the decorative elements rendered in the image are not sufficiently expressive.

In view of the foregoing, it is an object of the invention to provide an image processing device enhancing the expressiveness of images with decorative elements.

In order to attain the above and other objects, the invention provides an image processing device including a focal pixel setting unit, a near pixel setting unit, a calculating unit, a target pixel determining unit, and an editing unit. The focal pixel setting unit is configured to set a focal pixel among a plurality of pixels in an original image that is represented by original image data. The near pixel setting unit is configured to set a pixel near the focal pixel as a near pixel. The calculating unit is configured to calculate a characteristic value related to luminance of the focal pixel and luminance of the near pixel. The target pixel determining unit is configured to determine, as the target pixel, the focal pixel whose characteristic value satisfies a prescribed condition. The editing unit is configured to generate edited image data by editing the original image data. The edited image data represents an edited image having a supplemental image superimposed on the original image. The supplemental image is superimposed on an area encompassing the target pixel.

According to another aspect, the present invention provides a printing device including the image processing device described above and a printing unit that is configured to print the edited image on a recording medium based on the edited image data.

According to another aspect, the present invention provides an image processing method including: setting a focal pixel among a plurality of pixels in an original image that is represented by original image data; setting a pixel near the focal pixel as a near pixel; calculating a characteristic value related to luminance of the focal pixel and luminance of the near pixel; determining, as the target pixel, the focal pixel whose characteristic value satisfies a prescribed condition; and generating edited image data by editing the original image data, the edited image data representing an edited image having a supplemental image superimposed on the original image, the supplemental image being superimposed on an area encompassing the target pixel.

According to another aspect, the present invention provides a non-transitory computer readable storage medium storing a set of program instructions installed on and executed by a computer, the program instructions including: setting a focal pixel among a plurality of pixels in an original image that is represented by original image data; setting a pixel near the focal pixel as a near pixel; calculating a characteristic value related to luminance of the focal pixel and luminance of the near pixel; determining, as the target pixel, the focal pixel whose characteristic value satisfies a prescribed condition; and generating edited image data by editing the original image data, the edited image data representing an edited image having a supplemental image superimposed on the original image, the supplemental image being superimposed on an area encompassing the target pixel.

BRIEF DESCRIPTION OF THE DRAWINGS

The particular features and advantages of the invention as well as other objects will become apparent from the following description taken in connection with the accompanying drawings, in which.

DETAILED DESCRIPTION

Next, a computer 10 according to a first embodiment of the present invention will be described while referring to FIGS. 1 through 10. The computer 10 includes a CPU 11, a ROM 12, a RAM 13, a hard disk drive (HDD) 14, an operating unit 15, a display unit 16, and a network interface 17.

The ROM 12 stores various programs such as BIOS. The HDD 14 stores various software programs including an operating system (OS), application programs capable of editing graphic image data. The CPU 11 controls operations of the computer 10 in accordance with the programs read from the ROM 12 and the HDD 14 and stores the processing result in the RAM 13 and the HDD 14.

The operating unit 15 includes a keyboard and a pointing device and allows the user to input various instructions to the CPU 11 through external operations of the operating unit 15. The display unit 16 includes a display and displays various images in accordance with the control of the CPU 11. The network interface 17 is capable of connecting to communication lines (not shown) such a LAN and is capable of communicating with a printer and a computer that are connected with the communication lines.

Next, an embellishing process for rendering star patterns in an original image as decorative elements will be described. The CPU 11 of the computer 10 begins the embellishing process shown in FIG. 2 when the user of the computer 10 launches an application program for editing images using the operating unit 15, specifies a file stored on the HDD 14 or the like that holds original image data in which the user wishes to generate star patterns, and inputs an instruction to execute the embellishing process.

Figure 1:
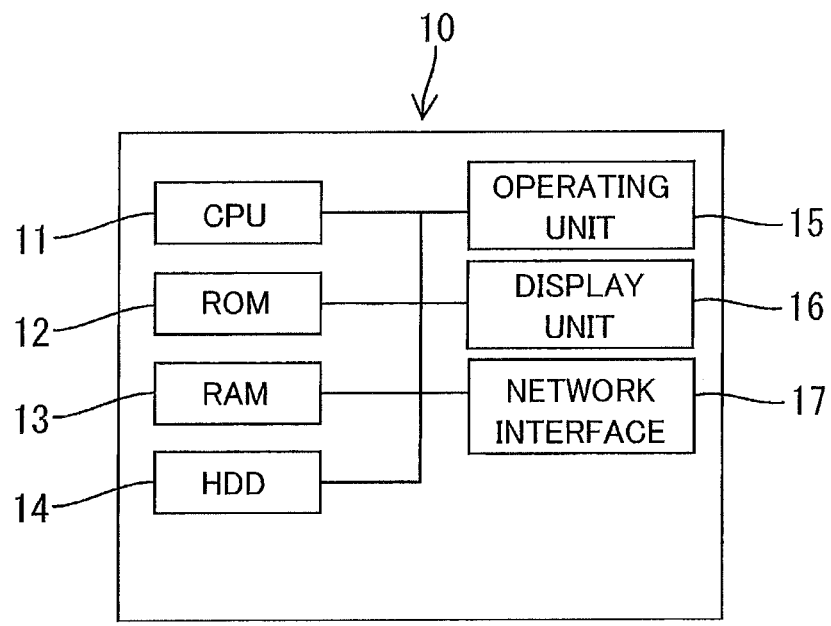
FIG. 1 is a block diagram showing an image processing device according to an embodiment of the invention.
Figure 2:
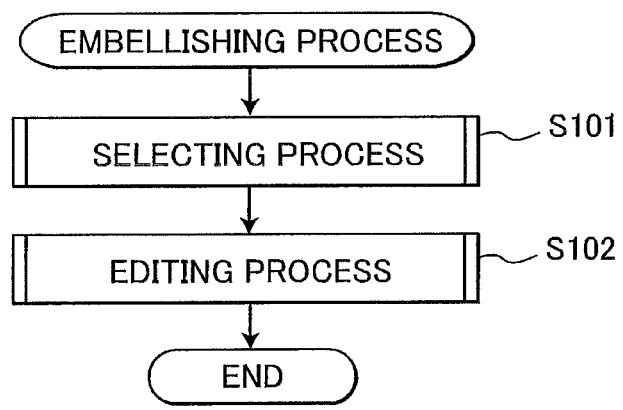
FIG. 2 is a flowchart illustrating steps in an embellishing process executed by the image processing device.

In S101 of the embellishing process shown in FIG. 2, the CPU 11 performs a selecting process to select target pixels in the original image data as targets for rendering star patterns (supplemental images). In S102 the CPU 11 performs an editing process to edit the original image data so that star patterns are rendered for the target pixels.

Next, the two processes mentioned in the embellishing process will be described in greater detail. In S201 at the beginning of the selection process in FIG. 3, the CPU 11 selects and sets one pixel from a plurality of pixels in the original image represented by the original image data as the focal pixel. As will be described later, the CPU 11 sequentially selects each pixel constituting the original image as a focal pixel during the selection process.

In S202 the CPU 11 sets neighboring pixels (near pixels) and finds a second characteristic value for the selected focal pixel. In the first embodiment, the second characteristic value is the variance of luminance for the selected focal pixel and neighboring pixels of the focal pixel. Using the example shown in FIG. 4, the focal pixel is pixel P(i, j) in the center position having coordinates (i, j), and the neighboring pixels are the 24 total pixels within the range (i−2 through i+2, j−2 through j+2), excluding the focal pixel.

The variance is one value that indicates the variation, or "spread," of luminance in a sample and is equivalent to the mean of the sample squared minus the square of the sample mean. Hence, if Py(i, j) denotes the luminance of the focal pixel, then the variance Var(i, j) for this focal pixel can be found from the following equation based on the average luminance of the focal pixel and its neighboring pixels for this focal pixel can be found from the following Equation 1 based on the average luminance of the focal pixel and its neighboring pixels AvePy(i, j) and the average of the square of this luminance AvePy2(i, j).

$$\text{Var}(i,j) = \text{AvePy2}(i,j) - ((\text{AvePy}(i,j))^2 \quad \text{Equation 1}$$

The original image data in the first embodiment has an 8-bit (256-level) gradation value for each of the RGB colors. It is well known that the luminance of a pixel is near the green gradation value for that pixel. Therefore, the following expression can be used to approximate the variance Var(i, j) based on the average green gradation value for the focal pixel and its neighboring pixels AvePg(i, j) and the mean of the square of this gradation value AvePg2(i, j).

$$\text{Var}(i,j) \approx \text{AvePg2}(i,j) - ((\text{AvePg}(i,j))^2 \quad \text{Equation 2}$$

Equations for finding the luminance (Py) of a pixel from gradation values of the RGB colors (Pr, Pg, Pb) are well known in the art (for example, Py=0.30Pr+0.59Pg+0.11Pb). The variance Var(i, j) may be found from Equation 1 using one of these conventional equations for finding luminance.

Next, the variance Var(i, j) is normalized to the range 0.0-1.0, and the normalized variance is set as the second characteristic value f(i, j). Since the maximum value of variance Var(i, j) is 255 squared, the second characteristic value f(i, j) is found from the following Equation 3.

$$f(i,j) = \text{Var}(i,j)/255^2 \quad \text{Equation 3}$$

Figure 3:
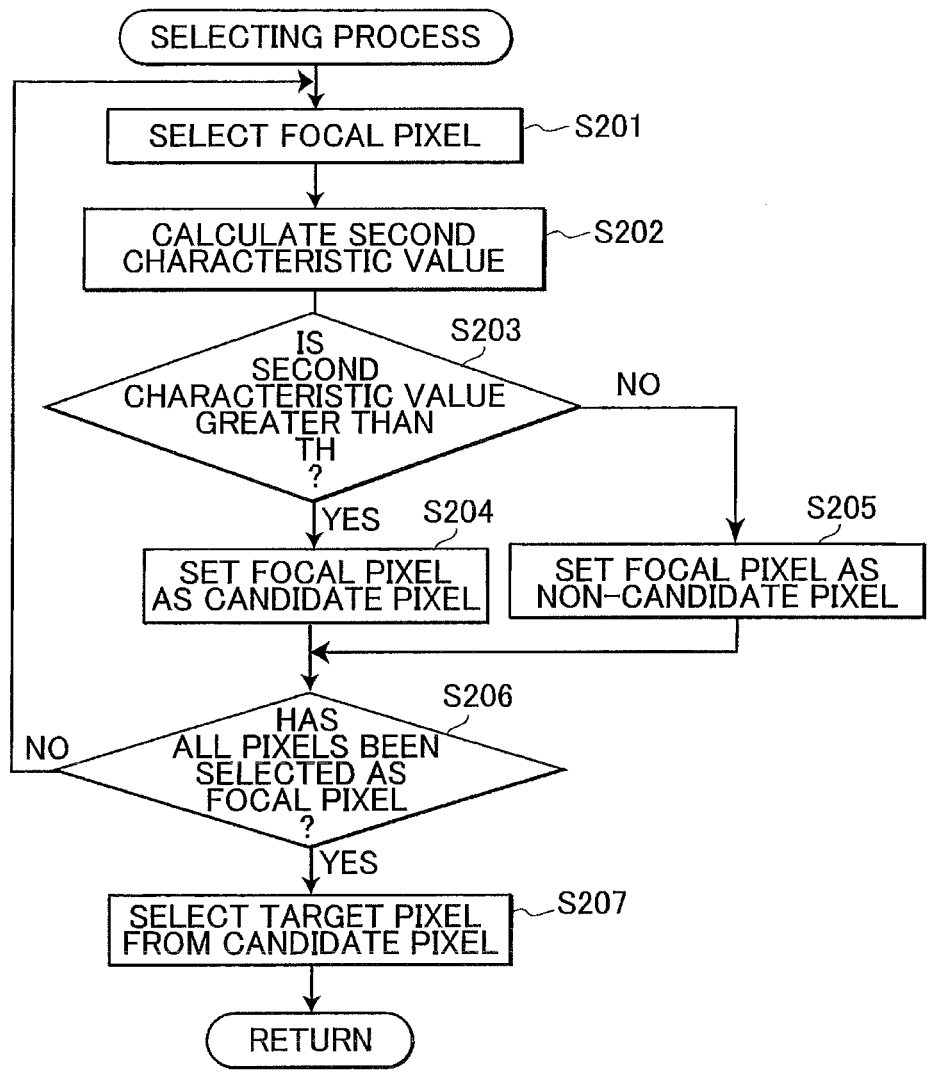
FIG. 3 is a flowchart illustrating steps in a selecting process in FIG. 2.
Figure 4:
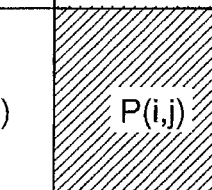
FIG. 4 is an explanatory diagram illustrating the relationship between a focal pixel and neighboring pixels.

Returning to the flowchart in FIG. 3, in S203 the CPU 11 determines whether or not the second characteristic value f(i, j) is greater than a predetermined reference value (0.15 in the first embodiment). This reference value is a threshold for determining whether the focal pixel is a candidate for representing a star pattern pixel (hereinafter referred to as a "candidate pixel") and can be modified appropriately within the range 0.0<Th<1.0, where Th is the reference value.

If the second characteristic value f(i, j) is greater than the reference value Th (0.15; S203: YES), in S204 the CPU 11 stores this focal pixel in the RAM 13 as a candidate pixel. However, if the second characteristic value f(i, j) is less than or equal to the reference value Th (S203: NO), in S205 the CPU 11 stores this focal pixel in the RAM 13 as a non-candidate pixel.

In S206 the CPU 11 determines whether all pixels in the original image data have been selected as the focal pixel in S201. When there remain pixels that have not been selected as the focal pixel (S206: NO), the CPU 11 returns to S201 and repeats the above process for a different pixel that was not previously selected as the focal pixel. Through this process, the CPU 11 extracts focal pixels from the original image data as candidate pixels when the variation between the focal pixel and its neighboring pixels is large.

When the CPU 11 determines in S206 that all pixels have been selected one time as the focal pixel (S206: YES), in S207 the CPU 11 selects candidate pixels to be target pixels representing a star pattern image.

In S207, the target pixels may be pixels randomly extracted from the candidate pixels at a prescribed probability (0.1%, for example). This probability may be set to a suitable value greater than 0% and less than 100%. A proper number of pixels can be set as target pixels by decreasing the probability when the number of candidate pixels is high and increasing the probability when the number is low.

By adjusting the probability, the CPU 11 can select candidate pixels of a number equal to or near a predetermined number to be target pixels. One way to find a suitable probability is to divide the predetermined number of target pixels by the total number of candidate pixels The CPU 11 executes the editing process of S102 after completing this selection process in S207.

Figure 5:
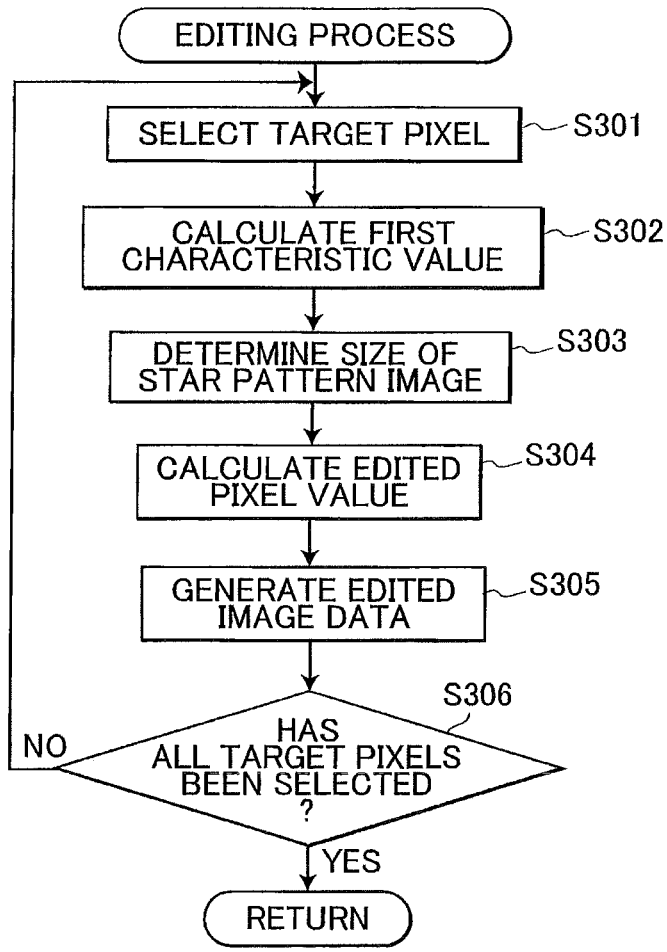
FIG. 5 is a flowchart illustrating steps in a selecting process in FIG. 2.

In S301 at the beginning of the editing process in FIG. 5, the CPU 11 selects one pixel from among the target pixels selected in the selecting process. In S302 the CPU 11 calculates a first characteristic value of the target pixel selected in S301 for determining the form of the star pattern that will be rendered. In the first embodiment, the first characteristic value is a value obtained by normalizing (according to a different method than that used for the second characteristic value) the value indicating the degree of variation (spread) in luminance values for the target pixel and its neighboring pixels. The neighboring pixels of the target pixel are pixels that fall within the same range as the neighboring pixels for the focal pixel described earlier (see FIG. 4).

In order to find the first characteristic value, first the CPU 11 finds the second characteristic value f(i, j), which is the variance of luminance for the target pixel at coordinates (i, j) and its neighboring pixels, using the method described earlier. The second characteristic value f(i, j) is a value that falls within the range Th<f(i, j)≤1.0. In order to concentrate the distribution of second characteristic values for a plurality of target pixels near the reference value Th, the range of distribution is adjusted using the following Equation 4.

$$Var''(i,j)=8\times(Var(i,j)-0.15) \qquad \text{Equation 4}$$

In the above Equation 4, "0.15" is the reference value Th and "8" is a coefficient found experimentally. The value of Var"(i, j) found in this equation is normalized to the range 0.0-1.0 in the following Equation 5 to obtain a first characteristic value f' (i, j).

$$f'(i,j)=1.0, \text{ when } Var''(i,j)>1.0; \text{ and}$$

$$f'(i,j)=Var''(i,j), \text{ when } Var''(i,j)\leq 1.0 \qquad \text{Equation 5}$$

Figure 6:
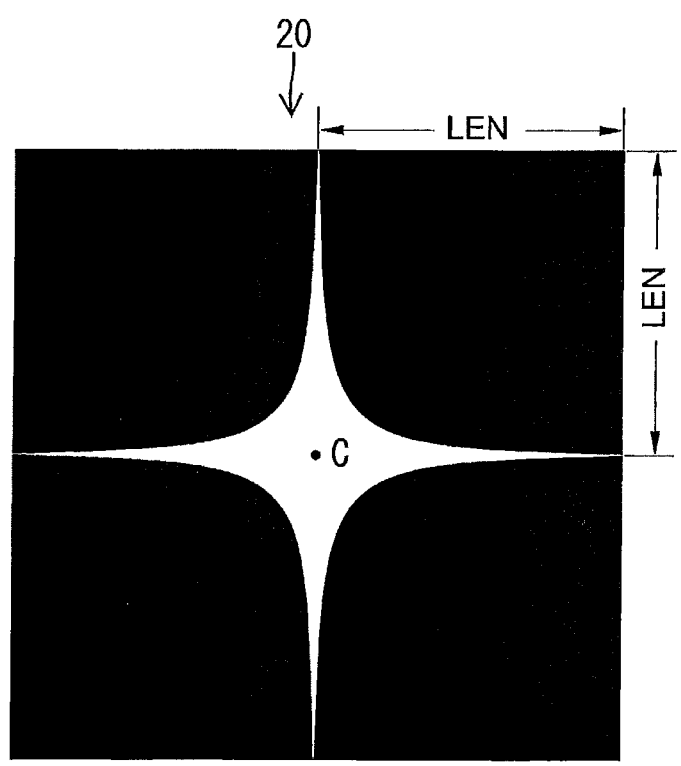
FIG. 6 is an explanatory diagram showing an example of a supplemental image.

In S303 the CPU 11 determines the size of the star pattern to be rendered for the target pixel based on the first characteristic value f'(i, j) found above. FIG. 6 shows an example of rendering a four-point star pattern 20. The shape of the star pattern can be modified as desired.

The star pattern 20 has four rays (radiating lines) of equal length extending respectively up, down, left, and right from a center point C. The length LEN of each radiating line can be calculated from the following Equation 6 based on the first characteristic value f' (i, j), where the length LEN is expressed in pixels.

$$LEN=((Smax-Smin)f'(i,j)+Smin)\times XY max/L \qquad \text{Equation 6}$$

In the above Equation 6, XYmax is the length of the longer side between the vertical and horizontal sides of the original image data (in number of pixels), and L is a predetermined constant. Hence, the length LEN of the radiating line is proportional to the length in pixels of the long side of the original image data.

Further, Smax and Smin in the above equation 6 are constants defining the maximum and minimum possible values of the length LEN for each radiating line, where Smax>Smin. When the first characteristic value f'(i, j) is "1" the value within the outer parentheses of Equation 6 is Smax. When the first characteristic value f'(i, j) approaches "0", the value within the outer parentheses approaches Smin. In other words, the length LEN of the radiating lines increases as first characteristic value f'(i, j) increases.

Returning to the flowchart in FIG. 5, in S304 the CPU 11 calculates edited pixel values for each pixel within the target region of the original image data for rendering the star pattern 20. The target region in this example is a (2×LEN+1)×(2×LEN+1) square-shaped area centered on the target pixel. In this process, the CPU 11 renders a star pattern in the edited image by increasing the luminance of pixels rendering the star pattern 20 in the target region.

More specifically, the application program has basic data specifying relationships between coordinates for rendering the star pattern and the degree for accentuating luminance. Based on this data, the CPU 11 calculates a function γ(m, n) for rendering the star pattern 20 shown in FIG. 6. The variables m and n are values within the range −LEN≤m,n≤LEN and specify coordinates (m, n) in reference to the center point C.

The function γ(m, n) indicates the accentuation of luminance (degree of increase) and is a value within the range 0.0≤γ(m, n)≤1.0. For pixels near the center point C of the star pattern 20, Δ(m, n)=1.0, indicating the largest accentuation of luminance. When moving from the center point C of the star pattern 20 toward the peripheral edges thereof, γ(m, n) gradually decreases from 1.0. In areas outside of the star pattern 20 (black regions in FIG. 6), γ(m, n)=0.0.

The edited pixel value P'(i+m, j+n) is found from the following equation 7, where (i, j) are the coordinates of the target pixel and P(i+m, j+n) is the corresponding pixel value in the original image data.

$$P'(i+m,j+n)=\{255-(\gamma(m,n)\times E)\}/255\times P(i+m,j+n)+(\gamma(m,n)\times E) \qquad \text{Equation 7}$$

The resulting edited pixel value indicates the gradation value of the corresponding RGB color. That is, gradation values Pr', Pg', and Pb' are found for the respective RGB colors in the edited image by inputting the corresponding gradation values Pr, Pg, and Pb for RGB colors in the original image into Equation 7. Further, E is a coefficient that is multiplied by the function γ, which indicates the accentuation level of luminance, in order to set the accentuation level. The coefficient E is found from the following Equation 8.

$$E=Pg(i,j)\times Li \qquad \text{Equation 8}$$

Here, Pg(i, j) is the gradation value for green in the target pixel, and Li is a predetermined coefficient having a value in the range 0.0≤Li≤1.0. Accordingly, the coefficient E is largest when Li is 1.0. Pg(i, j) is used to approximate a value specifying the luminance of the target pixel. However, the luminance value Py(i, j) may be used in place of Pg(i, j) in the above equation to find the coefficient E.

Using Equations 7 and 8, edited pixel values are found for each pixel in the target region centered on the target pixel by first multiplying the pixel value in the original image by a coefficient and then adding an accentuation amount for luminance. Hence, pixel values in the original image data and the luminance of the target pixel are reflected in the value of each pixel representing the star pattern image.

The amount of luminance accentuation (γ×E) is largest near the center point C of the star pattern, i.e., near the target pixel. Further, through Equation 8, the accentuation amount of luminance increases as the luminance of the target pixel increases. In other words, the average luminance for the pixels rendering the star pattern image is larger, the larger the luminance of the target pixel. Further, since γ is 0 in areas outside the star pattern (black regions in FIG. 6), P' is equal to P (that is, the value in the original image is not changed) in these areas.

Returning to the flowchart in FIG. 5, in S305 the CPU 11 generates edited image data in the RAM 13 by replacing values of pixels in the target region of the original image data with the pixel values calculated in S304. Subsequent editing of image data is performed by treating the image data generated in S305 as the original image data. Accordingly, when two star pattern images overlap, for example, the image data edited to render the first star pattern image is further edited to render the second star pattern image, thereby rendering decorative elements with a more natural expression.

In S306 the CPU 11 determines whether all target pixels have been selected in S301. When there remain target pixels that have not yet been selected (S306: NO), the CPU 11 returns to S301, selects a target pixel that has not yet been processed, and repeats the above process. In this way, a process for rendering a star pattern image is performed for all target pixels.

When the CPU 11 determines in S306 that all target pixels have been selected in S301 (S306: YES), the CPU 11 ends the editing process, completing the embellishing process.

In this way, the CPU 11 generates image data in the RAM 13 by editing the original image data. The CPU 11 generates the edited image data representing an edited image having the supplemental star pattern superimposed on the original image. The star pattern is superimposed on an area encompassing the target pixel. This edited image data may be saved on the HDD 14 and/or an edited image based on this image data may be displayed on the display unit 16. Further, the CPU 11 may convert the edited image data to print data using a printer driver, transmit the print data to a printer via the network interface 17, and print the edited image on paper or the like.

Figure 7:
FIG. 7 is an explanatory diagram showing an example of an original image.
Figure 8:
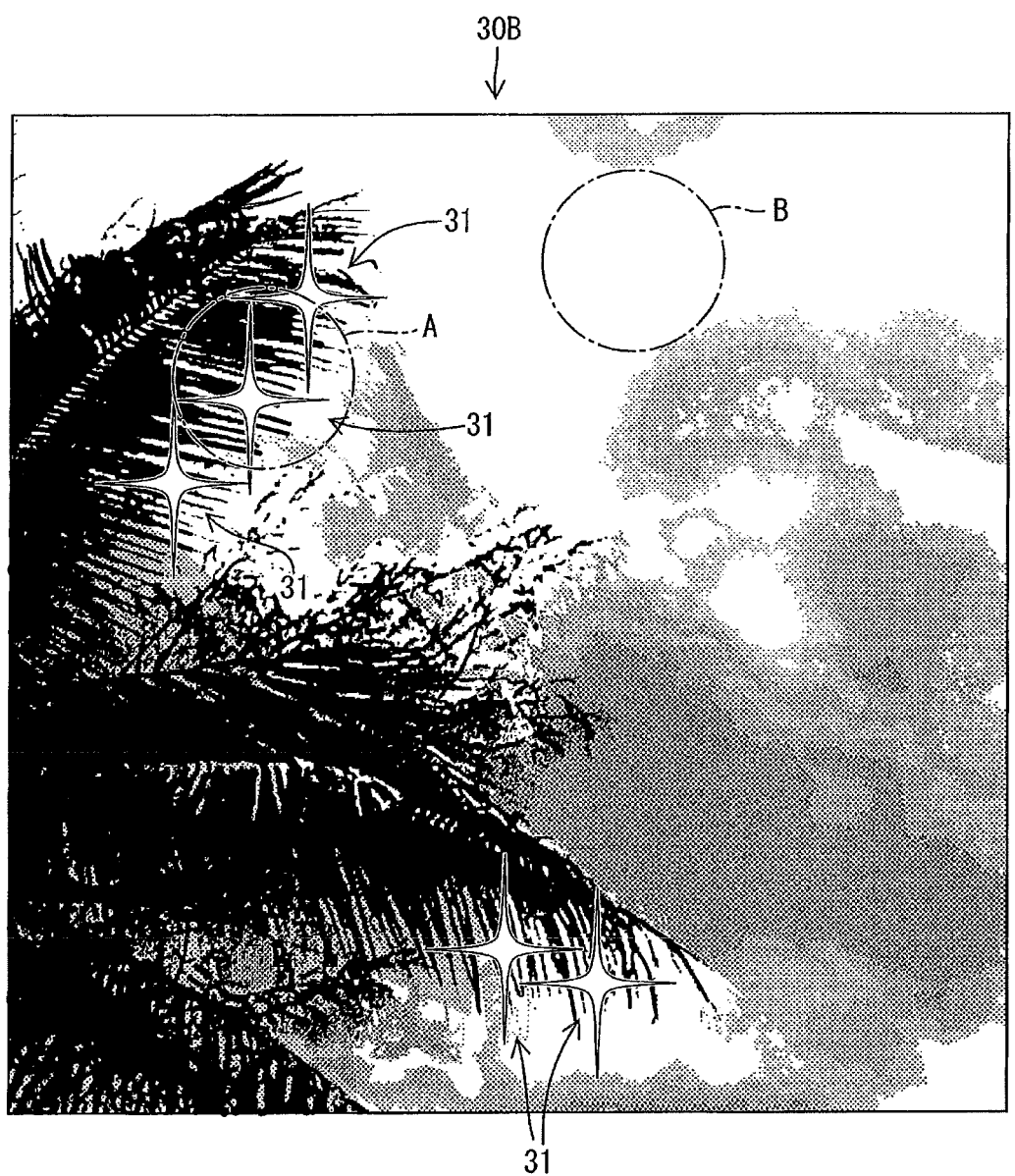
FIG. 8 is an explanatory diagram showing an edited image generated by editing the original image shown in FIG. 7.

Next, examples will be described for editing images using the embellishing process described above. FIG. 7 shows an original image 30A. FIG. 8 shows an edited image 30B produced by editing the original image in FIG. 7.

The original image 30A shown in FIG. 7 is a photograph taken during the daytime with the sky in the background and a tree in the foreground. The area of the image representing the tree is dark overall, with most pixels having low luminance, while the portion rendering the sky is bright overall, with concentrations of pixels having high luminance (i.e., very little variation in luminance), particularly in regions rendering the clouds (region B, for example). When star pattern images are rendered according to the conventional method of simply extracting pixels with high luminance from the original image 30A, star pattern images would be rendered in bright cloud regions, such as region B, an expression that is not very effective.

However, in the selecting process of the first embodiment, focal pixels whose luminance varies greatly from its neighboring pixels are selected as target pixels. Hence, the CPU 11 selects as target pixels pixels in regions containing a mixture of high-luminance and low-luminance pixels, such as region A, which includes border areas between the tree and the sky, and renders star pattern images 31 around the selected target pixels. Hence, the CPU 11 can produce a more effective expression, as in the leaves of the tree reflecting light.

Figure 9:
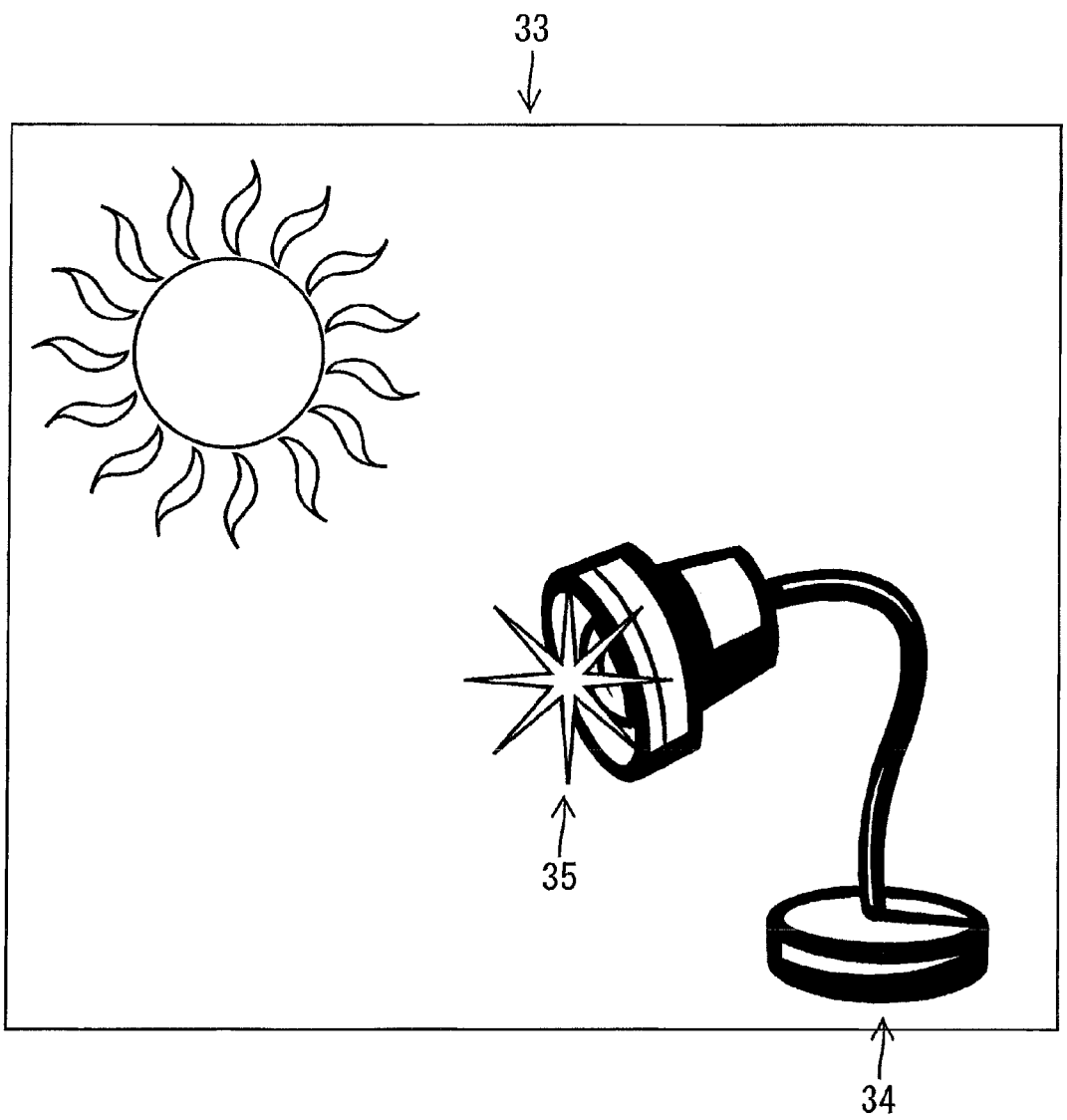
FIG. 9 is an explanatory diagram showing an edited image depicting an lamp in a light background.
Figure 10:
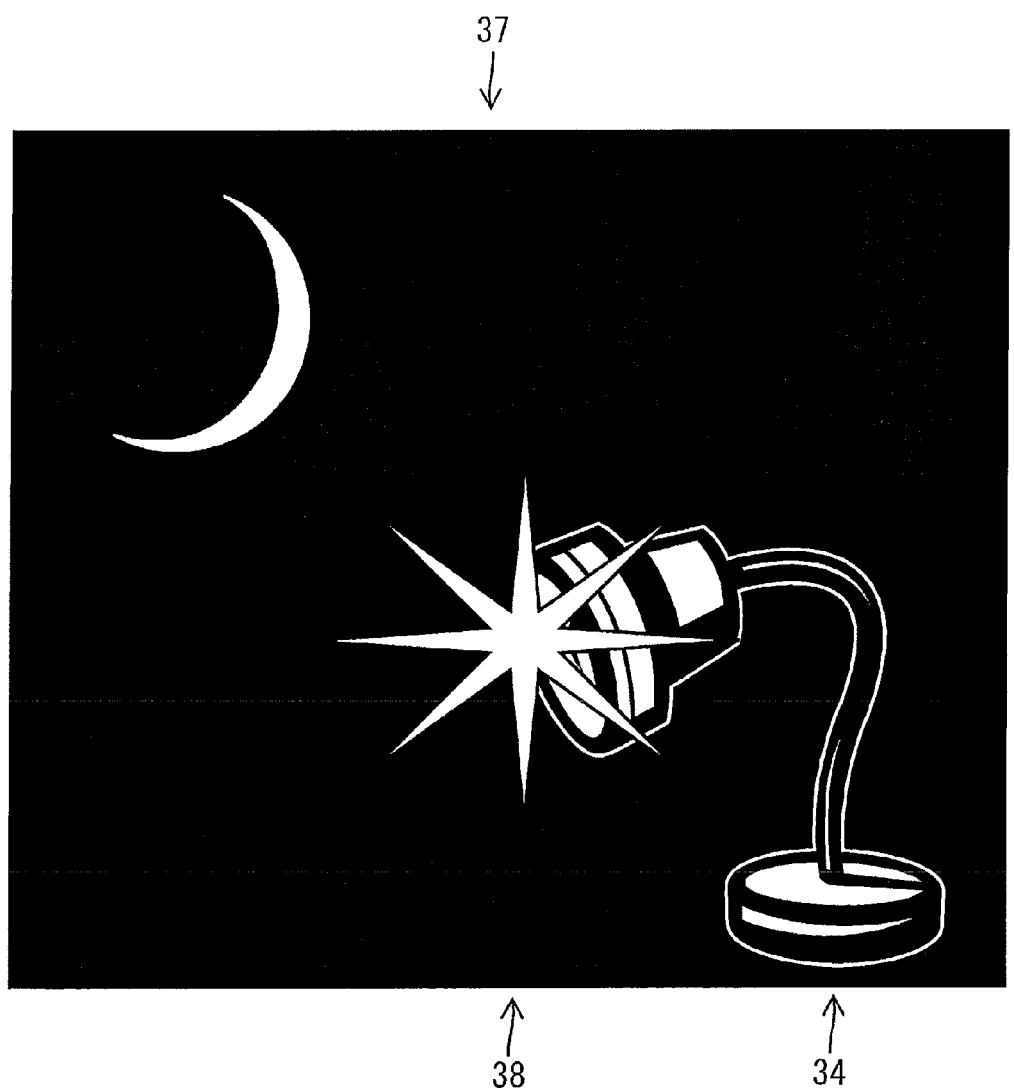
FIG. 10 is an explanatory diagram showing an edited image depicting a lamp in a dark background.

FIGS. 9 and 10 show images 33 and 37, respectively, which are produced by editing separate original images. The image 33 of FIG. 9 depicts a bright, sunny background with a lamp 34 in the foreground, and a star pattern image 35 has been produced in the original image. The image 37 of FIG. 10 depicts the same lamp 34 in the foreground with a dark, nighttime background, and renders a star pattern image 38 in the original image. The images 33 and 37 are equal in size.

When the CPU 11 selects a pixel near the border between the lamp 34 and the background as a target pixel for the image 33 of FIG. 9, the first characteristic value f' indicating the variation of luminance between the target pixel and its neighboring pixels is relatively small. Therefore, the length LEN of the rays of light calculated from Equation 6 is relatively small.

On the other hand, in the image 37 of FIG. 10, the first characteristic value f' indicating the variation of luminance between the target pixel and its neighboring pixels is relatively large for the target pixel selected near the border between the lamp 34 and the background. Hence, the length LEN of the rays of light calculated from Equation 6 is larger than that in FIG. 9. In this way, the star pattern image is larger for the light of light sources and the like depicted with a dark background than when depicted with a bright background, producing more natural decorative elements that do not seem out of place.

In the first embodiment described above, the CPU 11 selects target pixels as pixels whose second characteristic value f related to the variation between luminance of the pixel and the neighboring pixels satisfies a prescribed condition (S203: YES), edits the original image data to render star pattern images around these target pixels, and generates edited data representing the edited image. In this way, the computer 10 of the first embodiment can enhance the expressiveness in the edited image more than when target pixels are set simply to pixels having high luminance.

By selecting focal pixels as target pixels based on the single condition that the variation of luminance between the focal pixel and its neighboring pixels is greater than a reference value (S203: YES), the CPU 11 is more likely to select target pixels from regions having a concentration of pixels with a large difference in luminance, such as the border area between a bright image and a dark image, than from a region having a concentration of pixels with similar luminance values.

Further, by randomly extracting only some of the candidate pixels that meet the above condition based on a prescribed probability (0.1%, for example) as target pixels (S207), the computer 10 can produce a more natural effect in which the positions of the star patterns are suitably scattered.

The computer 10 also calculates RGB gradation values (pixel values) for pixels rendering star patterns based on values of the pixels in the original image (RGB gradation values) and the values of the target pixels (the green gradation values or luminance values) based on Equation 7. In this way, the computer 10 can blend the color and luminance of the star patterns with the original image.

Further, since the average luminance of pixels in the decorative element being rendered increases as the luminance of the target pixel increases (Equation 8), the computer 10 can adjust the brightness of the decorative element based on the brightness of the target pixel.

Further, by setting the size of the star pattern image (i.e., the number of pixels) based on the number of pixels in the original image (Equation 6), the computer 10 can render the star pattern image at a suitable size for the original image.

The computer 10 also determines the size of the star pattern image being rendered based on the first characteristic value f', which is related to the variation in luminance between the target pixel and its neighboring pixels (Equation 6). In this way, the computer 10 can enhance expression in the image.

Specifically, by increasing the size of the star pattern image for larger variations in luminance between the target pixel and its neighboring pixels, the computer 10 can further accentuate light from light sources and the like depicted with a dark background, for example.

Next, a second embodiment of the present invention will be described. Since the structure of the computer 10 according to the second embodiment and the majority of the processes executed by this computer 10 are identical to those described in the first embodiment, like parts and components are designated with the same reference numerals and like process steps will be designated with the same step numbers to avoid duplicating description.

In the first embodiment, the first characteristic value indicates the variation of luminance between the focal pixel and its neighboring pixels, while the second characteristic value indicates the variation of luminance between a target pixel and its neighboring pixels. However, the first and second characteristic values in the second embodiment indicate the difference between the respective focal pixel and target pixel and its neighboring pixels.

In the selecting process of FIG. 3 according to the second embodiment, after selecting a focal pixel (S201), in S202 the CPU 11 finds the difference between the luminance of the focal pixel and its neighboring pixels as the second characteristic value. Specifically, a second characteristic value f'(i, j)

is found using the following Equation 9 for taking the difference between the luminance of the focal pixel Py(i, j) and the average luminance of its neighboring pixels AvePy(i, j).

$$f'(i, j)=Py(i, j)-AvePy(i, j) \quad \text{Equation 9}$$

The neighboring pixels of the focal pixel may be pixels that fall within the same range as that described in the first embodiment or pixels that fall within a different range. Further, the second characteristic value f'(i, j) in Equation 9 may be calculated using the green gradation value Pg(i, j) in place of the luminance value Py(i, j) and the average green gradation value of neighboring pixels AvePg(i, j) in place of the average luminance of the neighboring pixels AvePy(i, j).

In S203 the CPU 11 determines whether the second characteristic value f'(i, j) calculated in S202 is greater than a predetermined reference value Th2. When the second characteristic value is greater than the reference value Th2 (S203: YES), in S204 the CPU 11 sets this focal pixel as a candidate pixel. If the second characteristic value is no greater than the reference value Th2 (S203: NO), in S205 the CPU 11 sets the target pixel as a non-candidate pixel. Subsequently, in S207 the CPU 11 selects target pixels from these candidate pixels. In the determination of S203 in FIG. 3 according to the second embodiment, the reference value Th2 is used in place of the reference value Th.

Next, in the editing process shown in FIG. 5, the CPU 11 selects a target pixel (S301) and finds a first characteristic value for this target pixel (S302). This first characteristic value indicates the difference between the luminance of the target pixel and its neighboring pixels and may be a value calculated by normalizing f'(i, j) suitably or may be calculated without using f'(i, j). The size of the star pattern image may be determined by replacing f'(i, j) in Equation 6 with this first characteristic value and by setting the coefficient to a suitable value.

In the second embodiment described above, the CPU 11 selects target pixels as pixels whose second characteristic value f'(i, j) related to the difference in luminance between the focal pixel and the neighboring pixels satisfies a prescribed condition, and edits the original image data to render star pattern images around these target pixels. In this way, the computer 10 of the second embodiment can enhance the expressiveness in the edited image more than when target pixels are set simply to pixels having high luminance.

By selecting focal pixels as target pixels based on the single condition that the difference in luminance between the focal pixel and its neighboring pixels is greater than a reference value, the CPU 11 is more likely to select target pixels from regions having a concentration of pixels with a large difference in luminance, such as the border area between a bright image and a dark image, than from a region having a concentration of pixels with similar luminance values.

Similar effects as those described in the first embodiment can be obtained in the second embodiment by using the first characteristic value related to the difference in luminance between the target pixel and its neighboring pixels and the second characteristic value related to the difference between the luminance of the focal pixel and its neighboring pixels in place of the first and second characteristic values of the first embodiment.

While the invention has been described in detail with reference to specific embodiments thereof, it would be apparent to those skilled in the art that many modifications and variations may be made therein without departing from the spirit of the invention, the scope of which is defined by the attached claims.

Figure 11:
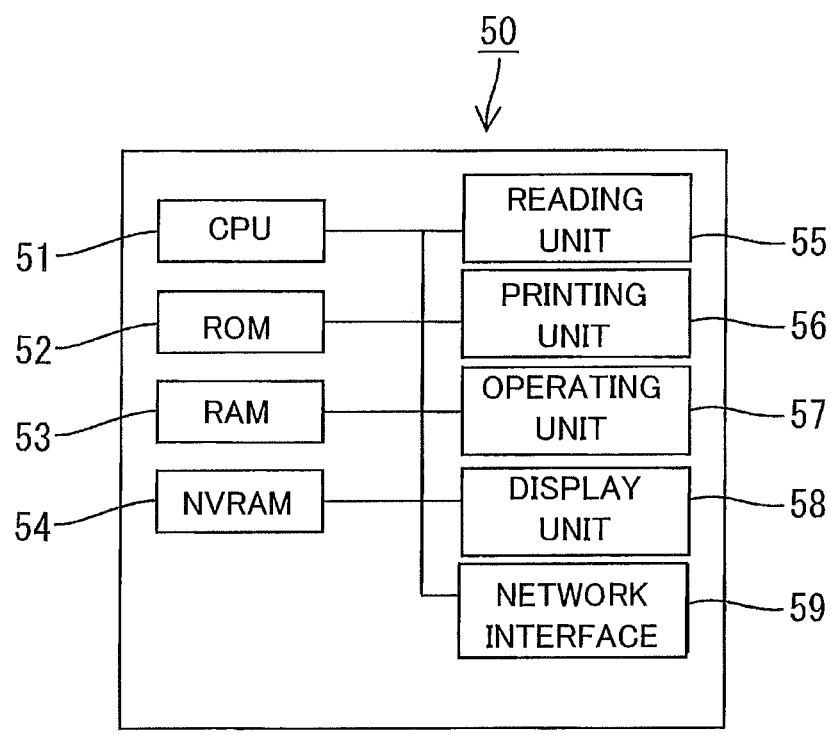
FIG. 11 is a block diagram showing an image processing device according to a modification of the invention.

(1) While the present invention is applied to a computer in the first and second embodiments, the present invention may also be applied to a printing device. FIG. 11 shows an example of a printing device 50. The printing device 50 includes a CPU 51, a ROM 52, a RAM 53, a NVRAM 54, a reading unit 55, a printing unit 56, an operating unit 57, a display unit 58, and a network interface 59.

In response to instructions that the user inputs on the operating unit 57, the CPU 51 executes the embellishing process on original image data acquired when the reading unit 55 reads an image from an original or on original image data received from an external computer or the like (not shown) via the network interface 59, for example, and generates star pattern images. The CPU 51 controls the printing unit 56 to print the edited image data on paper or another recording medium.

(2) For the star pattern images rendered in the original image, the number, size, color, and position in relation to the target pixel (the angle of rotation relative to the center point, for example) of radiating lines in the star pattern images can be modified as desired. The image processor can also generate decorative elements of various shapes, such as a hexagonal or heart shape, and is not limited to star pattern images. The image processor is particularly effective when generating images that enhance light from light sources in the original image or portions of the image with high luminance as decorative elements, but is not limited to these aspects.

(3) The shape, size, color, number, and the like of decorative elements may be determined based on user preferences.

(4) In the first and second embodiments, the image processor determines the size of the star pattern images based on the first characteristic value. However, the image processor may determine the form of the decorative elements, including its shape, color, and luminance, as follows.

First, the image processor may modify the number of radiating lines based on the first characteristic value. For example, the image processor may set a larger number of radiating lines for a larger difference in the variation of luminance between the target pixel and its neighboring pixels, as in six radiating lines for a first characteristic value f' in the range 0.6-0.8 and eight radiating lines for a first characteristic value f' in the range 0.8-1.0.

The image processor may also modify the color of the decorative elements based on the first characteristic value. For example, the image processor may set the color of the element to red when the first characteristic value f' is in the range 0.6-0.8 and orange when the first characteristic value f' is in the range 0.8-1.0.

The image processor may also modify the luminance of the decorative elements based on the first characteristic value. For example, the coefficient Li may be set to 0.8 in Equation 8 when the first characteristic value f' is in the range 0.6-0.8 and to 0.9 when the first characteristic value f' is in the range 0.8-1.0. A particularly effective expression can be reduced by increasing the luminance of the decorative element as the difference in variation of luminance increases between the target pixel and its neighboring pixels.

(5) In the first and second embodiments, the image processor determines the size of the star pattern images based on the length (number of pixels) of the longer side constituting the original image data. However, the image processor may determine the size of the decorative element based on the total number of pixels (area) in the original image data.

(6) In the first and second embodiments (Equation 7), the image processor calculates the pixel value (RGB gradation values) of pixels representing the star pattern image based on the pixel values (RGB gradation values) in the original image and the luminance (green gradation value) of the focal pixel. However, the image processor may calculate the pixel values of pixels rendering the star pattern image based on only one of these elements. For example, the image processor can produce a decorative element in a color unrelated to the color of the pixels in the original image. Further, while the pixel values are RGB gradation values in the first and second embodiments, values for luminance and color differences of pixels may be used as the pixel values, for example.

(7) In the first and second embodiments, the neighboring pixels of the focal pixel (or target pixel) are the 24 nearest pixels surrounding the focal pixel (or target pixel). However, the range and number of neighboring pixels may be modified as desired and need not be the same for the focal pixel and target pixel. For example, a single pixel adjacent to the focal pixel (or target pixel) may serve as the neighboring pixel. Further, the CPU 11 may set, as the near pixels (neighboring pixels), pixels near the focal pixel (or target pixel) excluding pixels adjacent to the focal pixel (or target pixel).

(8) In the first and second embodiments, the first and second characteristic values are values indicating the variation in luminance or values indicating the difference in luminance, but the characteristic values may be related to both the variation in luminance and the difference in luminance. For example, the first characteristic value or second characteristic value may be a value obtained by multiplying the variance indicating variation in luminance and a value indicating the difference in luminance by respective suitable coefficients and by adding the two results.

(9) In the first and second embodiments, the target pixel is positioned in the center of the decorative element, but the position of the target pixel is not limited to the center point. For example, the target pixel may be positioned near one end of the decorative element, or the decorative element may be arranged in a location apart from the target pixel.

(10) In the first and second embodiments, the image processor selects a plurality of candidate pixels from the original image data and selects target pixels from the plurality of candidate pixels, but the image processor may set all pixels having a second characteristic value that exceeds a reference value to target pixels. Further, in the process of S207 for selecting target pixels from the plurality of candidate pixels, the image processor may select target pixels for producing a predetermined number of decorative elements.

(11) In the first and second embodiments, the image data has 8-bit (256-level) data for each of the RGB colors, but the image processor of the present invention may be configured to edit data having different gradation values, such as 2-bit, 4-bit, or 16-bit image data. Further, the image data edited by the image processor may be a different data format than RGB data, such as YUV data.

Further, in Equation 7 the image processor finds RGB gradation values (pixel values) in the edited image based on RGB gradation values (pixel values) in the original image data and the luminance (pixel value) of the target pixel, but these pixel values may be replaced with other types of pixel values as desired, such as a luminance Y and color differences U and V. In other words, the image processor can adapt the color and luminance of the star pattern image to the original image by calculating values of pixels rendering the star pattern image based on the values of pixels in the same location of the original image and the value of the target pixel.

(12) In the editing process (FIG. 5) of the first and second embodiments, the image processor generates edited image data that includes star pattern images by calculating edited pixel values based on the first characteristic value f' and the length (number of pixels) of the longer side constituting the original image data for each target pixel, but the present invention is not limited to this process. For example, the image processor may generate edited image data by setting the decorative element to an image stored on the 1 to an image stored on the 14 or the like and by adding (synthesizing) this decorative element to each target pixel.

(13) In the first and second embodiments, the focal pixel setting unit, the near pixel setting unit, the calculating unit, the target pixel determining unit, and the editing unit of the present invention are all implemented by the same CPU. However, these units of the present invention may be implemented with different CPUs, ASICs, or other circuits.

What is claimed is:

1. An image processing device comprising:
    a focal pixel setting unit configured to set a focal pixel among a plurality of pixels in an original image that is represented by original image data;
    a near pixel setting unit configured to set a pixel near the focal pixel as a near pixel;
    a calculating unit configured to calculate a degree to which a luminance value of the focal pixel differs from a luminance value of the near pixel;
    a target pixel determining unit that is configured to determine the focal pixel as a target pixel when the degree is greater than a reference value; and
    an editing unit configured to generate edited image data by editing the original image data, the edited image data representing an edited image having a supplemental image superimposed on the original image, the supplemental image being superimposed on an area encompassing the target pixel.

2. The image processing device according to claim 1, wherein the calculating unit calculates a variation in the luminance between the focal pixel and the near pixel as the degree.

3. The image processing device according to claim 1, wherein the calculating unit calculates a difference between the luminance of the focal pixel and the luminance of the near pixel as the degree.

4. The image processing device according to claim 1, wherein the focal pixel setting unit updates the focal pixel in sequence on a pixel-by-pixel basis;
    wherein the near pixel setting unit sets a pixel near the updated focal pixel as the near pixel;
    wherein the calculating unit calculates the degree to which a luminance value of the updated focal pixel differs from a luminance value of the corresponding near pixel;
    wherein, when the original image includes a plurality of focal pixels each having the degree greater than the reference value, the target pixel determining unit determines a part of the plurality of focal pixels as at least one target pixel, and
    wherein the editing unit generates the edited image data by editing the original image data, the edited image data representing an edited image having at least one supplemental image superimposed on the original image, each of the at least one supplemental image corresponding to one of the at least one target pixel, each supplemental image being superimposed on an area encompassing the one of the at least one target pixel.

5. The image processing device according to claim 4, wherein the target pixel determining unit determines randomly a part of the plurality of focal pixels as the at least one target pixel at a prescribed probability.

6. The image processing device according to claim 1, wherein a plurality of pixels is contained in the area, each of the plurality of pixels contained in the area having a pixel value;

wherein the target pixel has a pixel value;
wherein the supplemental image has a plurality of supplemental pixels, each supplemental pixel having a pixel value and corresponding to one of the plurality of pixels contained in the area;
wherein the editing unit generates the edited image data by calculating the pixel value of each supplemental pixel based on both the pixel value of the target pixel and the pixel value of the one of plurality of pixels contained in the area.

7. The image processing device according to claim 1, wherein a plurality of pixels is contained in the area, each of the plurality of pixels contained in the area having a luminance value;
wherein the supplemental image has a plurality of supplemental pixels, each supplemental pixel having a luminance value and corresponding to one of the plurality of pixels contained in the area;
wherein the larger an average of luminance values of the plurality of supplemental pixels is larger, the larger the luminance value of the target pixel is.

8. The image processing device according to claim 1, wherein the supplemental image has supplemental pixels;
wherein the image processing device further comprises a pixel number determining unit configured to determine a number of supplemental pixels in the supplemental image based on a number of pixels contained in the original image.

9. A printing device comprising:
the image processing device according to claim 1; and
a printing unit that is configured to print the edited image on a recording medium based on the edited image data.

10. The wage processing device according to claim 1, further comprising:
an acquiring unit configured to acquire a characteristic value related to the degree; and
a setting unit configured to set, based on the characteristic value, at least one of a size of the supplemental image, a formation of the supplemental image, a color, of the supplemental image, and a luminance of the supplemental image.

11. An image processing device comprising:
a focal pixel setting unit configured to set a focal pixel among a plurality of pixels in an original image that is represented by original image data;
a near pixel setting unit configured to set a pixel near the focal pixel as a near pixel;
a calculating unit configured to calculate a characteristic value related to luminance of the focal pixel and luminance of the near pixel;
a target pixel determining unit configured to determine, as a target pixel, the focal pixel whose characteristic value satisfies a prescribed condition; and
an editing unit configured to generate first edited image data and second edited image data based on the original image data when the target pixel determining unit determines a first target pixel and a second target pixel different from the first target pixels, the first edited image data representing a first edited image having a first supplemental image superimposed on the original image, the first supplemental image being superimposed on an area encompassing the first target pixel,
the second edited image data representing a second edited image having a second supplemental image superimposed on the first edited image, the second supplemental image being superimposed on an area encompassing the second target pixel.

12. A non-transitory computer readable storage medium storing a set of program instructions installed on and executed by a computer, the program instructions comprising:
setting a focal pixel among a plurality of pixels in an original image that is represented by original image data;
setting a pixel near the focal pixel as a near pixel;
calculating a degree to which a luminance value of the focal pixel differs from a luminance value of the near pixel;
determining the focal pixel, as a target pixel when the degree is greater than a reference value; and
generating edited image data by editing the original image data, the edited image data representing an edited image having a supplemental image superimposed on the original image, the supplemental image being superimposed on an area encompassing the target pixel.

* * * * *